United States Patent
Kawakami et al.

(10) Patent No.: US 11,053,610 B2
(45) Date of Patent: Jul. 6, 2021

(54) READILY FIBRILLATIVE POLYVINYL ALCOHOL FIBER AND METHOD FOR MANUFACTURING SAME

(71) Applicant: KURARAY CO., LTD., Kurashiki (JP)

(72) Inventors: Masami Kawakami, Kurashiki (JP); Toshiaki Kobayashi, Kurashiki (JP); Hiroyuki Kawai, Kurashiki (JP); Shinichi Takemoto, Kurashiki (JP); Tomohiro Hayakawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 196 days.

(21) Appl. No.: 15/739,372

(22) PCT Filed: Jun. 22, 2016

(86) PCT No.: PCT/JP2016/068523
§ 371 (c)(1),
(2) Date: Dec. 22, 2017

(87) PCT Pub. No.: WO2016/208625
PCT Pub. Date: Dec. 29, 2016

(65) Prior Publication Data
US 2018/0179669 A1 Jun. 28, 2018

(30) Foreign Application Priority Data
Jun. 25, 2015 (JP) .............................. JP2015-127603

(51) Int. Cl.
| | |
|---|---|
| C08L 29/04 | (2006.01) |
| D01F 6/50 | (2006.01) |
| D01F 6/14 | (2006.01) |
| D01F 1/10 | (2006.01) |
| D01D 5/06 | (2006.01) |
| D01F 11/06 | (2006.01) |
| D02J 1/22 | (2006.01) |

(52) U.S. Cl.
CPC .............. D01F 6/50 (2013.01); C08L 29/04 (2013.01); D01D 5/06 (2013.01); D01F 1/10 (2013.01); D01F 6/14 (2013.01); D01F 11/06 (2013.01); D02J 1/222 (2013.01); D02J 1/223 (2013.01); D02J 1/224 (2013.01); *C08L 2203/12* (2013.01); *D10B 2321/06* (2013.01); *D10B 2331/06* (2013.01); *D10B 2401/021* (2013.01)

(58) Field of Classification Search
CPC ....... C08L 2203/12; C08L 29/04; D01D 5/06; D01F 6/14; D01F 6/50
See application file for complete search history.

(56) References Cited

U.S. PATENT DOCUMENTS

| | | | | |
|---|---|---|---|---|
| 4,083,906 | A | * | 4/1978 | Schindler .................. C08J 9/28 264/49 |
| 5,110,678 | A | | 5/1992 | Narukawa et al. |
| 5,972,501 | A | | 10/1999 | Ohmory et al. |
| 2006/0142499 | A1 | * | 6/2006 | Guntherberg ......... C08F 283/06 525/242 |

FOREIGN PATENT DOCUMENTS

| | | | |
|---|---|---|---|
| JP | S49-026519 | * | 7/1972 |
| JP | 47-31376 | B | 8/1972 |
| JP | 49-26519 | A | 3/1974 |
| JP | 55-28741 | A | 2/1980 |
| JP | 55-137212 | A | 10/1980 |
| JP | 61-19756 | A | 1/1986 |
| JP | 2-74694 | A | 3/1990 |
| JP | 3-234815 | A | 10/1991 |
| JP | 3-294511 | A | 12/1991 |
| JP | 8-284021 | A | 10/1996 |
| JP | 8-296121 | A | 11/1996 |
| JP | 10-237718 | A | 9/1998 |
| JP | 10-251951 | A | 9/1998 |
| JP | 2006-225795 | A | 8/2006 |
| JP | 2010-229560 | A | 10/2010 |

OTHER PUBLICATIONS

International Search Report dated Sep. 6, 2016 in connection with PCT/JP2016/068523 filed Jun. 22, 2016.
English translation of the International Preliminary Report on Patentability and Written Opinion of the International Searching Authority dated Jan. 4, 2018 in PCT/JP2016/068523 filed Jun. 22, 2016, 8 pages.
Extended European Search Report dated Dec. 19, 2018 in Patent Application No. 16814395.6, 7 pages.

* cited by examiner

*Primary Examiner* — Monique R Peets
(74) *Attorney, Agent, or Firm* — Oblon, McClelland, Maier & Neustadt, L.L.P.

(57) ABSTRACT

A polyvinyl alcohol fiber that can easily be fibrillated at a low manufacture cost is provided. The readily fibrillative polyvinyl alcohol fiber contains a polyalkylene oxide in addition to a polyvinyl alcohol. A mass ratio of the polyalkylene oxide ranges from 3 to 40% relative to the total mass of the polyvinyl alcohol and the polyalkylene oxide. A method for manufacturing the polyvinyl alcohol fiber is also provided.

19 Claims, No Drawings

READILY FIBRILLATIVE POLYVINYL ALCOHOL FIBER AND METHOD FOR MANUFACTURING SAME

TECHNICAL FIELD

The present invention relates to a readily fibrillative polyvinyl alcohol fiber that can easily be fibrillated and whose manufacture cost can be suppressed, and a method for manufacturing the same.

BACKGROUND ART

A fibril manufactured from a polyvinyl alcohol-based polymer is widely used in various fields because of its properties such as denseness, lightweight property, and flexibility. For example, in the field of batteries, the fibril based on the polyvinyl alcohol-based polymer is used as a separator in a battery including no mercury. This fibril is advantageous from the viewpoint of reduction of environmental pollution, is also excellent in the alkali liquid absorption property, and is therefore a highly useful material as separator.

This fibril is also usable as a clothing material for medical and hygienic service workers to protect their bodies from pathogens, viruses, and body fluids of patients, and is used in, for example, a surgical gown, a mask, a cap, a surgical table sheet, a bed coverlet, a patient gown, and a pillow case. The clothing material does not generate any hazardous gas when this clothing material is disposed of, and therefore is highly useful also from the viewpoint of the environmental protection.

A method has been proposed that utilizes a phase separation phenomenon of a blended polymer to obtain a fibril based on a vinyl alcohol-based polymer. For example, in each of Patent Documents 1 and 2, a method of using a blended polymer including a vinyl alcohol-based polymer as its see component, and a starch or a cellulose-based polymer as its island component is proposed. Beating the fiber obtained using this method enables manufacture of a fibril that has suppressed elution during the beating, a high alkali liquid absorption property, and a thermal solubility.

PRIOR ART DOCUMENTS

Patent Documents

Patent Document 1: Japanese Laid-Open Patent Publication No. 8-284021
Patent Document 2: Japanese Laid-Open Patent Publication No. 8-296121

SUMMARY OF THE INVENTION

Problem to be Solved by the Invention

With these methods, the blended polymer needs to be dissolved in an organic solvent when fiber spinning is performed and a problem therefore arises that the overall manufacture cost is high including that of a step of collecting the solvent, and the like.

An object of the present invention is to provide a readily fibrillative polyvinyl alcohol fiber that can easily be fibrillated and whose manufacture cost can be suppressed, and a method for manufacturing the same.

Means for Solving Problem

To solve the problem, the inventors made a great deal of study in detail on a readily fibrillative polyvinyl alcohol fiber and a method for manufacturing the same and, as a result, attained the present invention.

The present invention encompasses the following preferred embodiment.

[1] A readily fibrillative polyvinyl alcohol fiber including a polyalkylene oxide.

[2] The readily fibrillative polyvinyl alcohol fiber described in [1], wherein a mass ratio of the polyalkylene oxide is 3 to 40% by mass relative to the total amount of a polyvinyl alcohol and the polyalkylene oxide.

[3] The readily fibrillative polyvinyl alcohol fiber described in [1] or [2], wherein the acetalization degree of the polyvinyl alcohol is 3 to 40% by mol.

[4] The readily fibrillative polyvinyl alcohol fiber described in any one of claims [1] to [3], wherein the fiber true circle equivalent diameter of the readily fibrillative polyvinyl alcohol fiber is 5 to 50 μm.

[5] The readily fibrillative polyvinyl alcohol fiber described in any one of [1] to [4], wherein the polyalkylene oxide is at least one selected from the group consisting of a polyethylene oxide, a polypropylene oxide, and an ethylene oxide/propylene oxide copolymer.

[6] The readily fibrillative polyvinyl alcohol fiber described in any one of [1] to [5], wherein a weight average molecular weight of the polyalkylene oxide is 60,000 to 3,000,000.

A method for manufacturing the readily fibrillative polyvinyl alcohol fiber described in any one of [1] to [6], the method comprising
  a preparation step of preparing a spinning dope that comprises a polyvinyl alcohol, a polyalkylene oxide, and water,
  a spinning step of obtaining a fiber by performing spinning using the spinning dope,
  a stretching step of stretching the fiber, and
  an acetalization step of acetalizing the polyvinyl alcohol comprised in the fiber.

Effect of the Invention

According to the present invention, the readily fibrillative polyvinyl alcohol fiber that can easily be fibrillated and whose manufacture cost can be suppressed, and a method for manufacturing the same can be provided.

MODES FOR CARRYING OUT THE INVENTION

The readily fibrillative fiber of the present invention comprises a polyvinyl alcohol. In the present invention, from the viewpoint of the oriented crystallization, the polyvinyl alcohol contains a vinyl alcohol constituent unit at a rate equal to or higher than 70% by mol, preferably, is equal to or higher than 90% by mol, more preferably, is equal to or higher than 95% by mol, further preferably, is equal to or higher than 98% by mol, further more preferably, is equal to or higher than 99% by mol, and, highly preferably, is equal to or higher than 99.8% by mol. Other monomers such as ethylene, itaconic acid, vinylamine, acrylamide, vinyl pivalate, maleic acid anhydride, and a sulfonic acid-containing vinyl compound may be copolymerized at a rate equal to or lower than 30% by mol relative to the polyvinyl alcohol. Preferably, the saponification degree is equal to or higher than 80% by mol. Though not especially limited, the viscosity average polymerization degree of the polyvinyl alcohol, preferably, is equal to or greater than 500 and, more preferably, is equal to or greater than 1,500 from the viewpoint of acquisition of a high-strength fibril. Though not especially limited, the upper limit value of the viscosity average polymerization degree of the polyvinyl alcohol is, for example, equal to or smaller than 4,000. To improve the hot water resistance, the polyvinyl alcohol may be acetalized by a post-reaction after its fiberization.

In the present invention, the acetalization degree of the polyvinyl alcohol, preferably, is equal to or higher than 3% by mol, more preferably, is equal to or higher than 6% by mol, further preferably, is equal to or higher than 10% by mol, preferably, is equal to or lower than 40% by mol, more preferably, is equal to or lower than 35% by mol, further preferably, is equal to or lower than 30% by mol, particularly preferably, is equal to or lower than 25% by mol, and, especially preferably, is equal to or lower than 20% by mol to be, for example, equal to or lower than 15% by mol. When the acetalization degree of the polyvinyl alcohol is equal to or higher than the above lower limit values, a readily fibrillative polyvinyl alcohol fiber excellent in the water resistance can be obtained. When the acetalization degree of the polyvinyl alcohol is equal to or lower than the above upper limit values, the readily fibrillatability of the polyvinyl alcohol fiber is further improved. It is considered that this is because the polyvinyl alcohol tends to swell when the fiber is immersed in water to cause interface peeling to tend to occur between the polyvinyl alcohol and the polyalkylene oxide in the case where the acetalization of the polyvinyl alcohol is equal to or lower than the above upper limit values.

For a readily fibrillative fiber comprising a cellulose-based polymer, cross-linking is advanced at the interface of the polyvinyl alcohol-based polymer/the cellulose-based polymer by an acetalization process performed after the fiberization and, as a result, the readily fibrillatability is significantly degraded. On the other hand, as to the readily fibrillative polyvinyl alcohol fiber of the present invention, even when the acetalization degree thereof is high, no cross-linking is advanced at the interface between the polyvinyl alcohol and the polyalkylene oxide, the readily fibrillatability thereof is not significantly degraded, and the water resistance can be imparted thereto. The "acetalization degree" is the rate of acetal bonds generated by a reaction between an acetal compound and hydroxyl groups of the polyvinyl alcohol, relative to polyvinyl alcohol constituent units, and represents the presence rate of the acetal bonds in the polyvinyl alcohol fiber. The acetalization degree of a polyvinyl alcohol can be calculated using $^1$H-NMR or $^{13}$C-NMR.

The readily fibrillative polyvinyl alcohol fiber of the present invention comprises a polyalkylene oxide. The polyalkylene oxide is a polymer whose constituent unit is an alkylene oxide. In the present invention, the polyalkylene oxide may be a polymer whose constituent unit is one single alkylene oxide or may be a copolymer whose constituent unit is plural alkylene oxides. Examples of polyalkylene oxide include, for example, a polymer whose constituent unit is an alkylene oxide having 2 to 6 carbon atoms, and include, for example, polyethylene oxide, polypropylene oxide, polybutylene oxide, polyisobutylene oxide, and copolymers and mixtures of these. The polyalkylene oxide in the present invention may be a copolymer with another monomer or may be modified, to the extent that this copolymer does not impair the effect of the present invention. When the polyalkylene oxide is the copolymer, the polymerization form of the copolymer is not especially limited and may be any one of a random form, a block form, a graft form, and a tapered form. In the present invention, from the viewpoint of improvement of the readily fibrillatability, more preferably, the polyalkylene oxide is at least one selected from the group consisting of a polyethylene oxide, a polypropylene oxide, and an ethylene oxide/propylene oxide copolymer. When the polyalkylene oxide is an ethylene oxide/propylene oxide copolymer, the mol ratio of an ethylene oxide monomer unit to a propylene oxide monomer unit (the ethylene oxide monomer unit [mol]/the propylene oxide monomer unit [mol]) constituting the ethylene oxide/propylene oxide copolymer, preferably, is 80/20 to 99/1, more preferably, is 85/15 to 95/5, and, further preferably, is 88/12 to 92/8, from the viewpoint of improvement of the readily fibrillatability.

In the present invention, the weight average molecular weight Mw of the polyalkylene oxide is equal to or greater than 50,000, more preferably, is equal to or greater than 60,000, further preferably, is equal to or greater than 70,000, preferably, is equal to or smaller than 3,000,000, more preferably, is equal to or smaller than 200,000, and, further preferably, is equal to or smaller than 150,000. When the weight average molecular weight Mw of the polyalkylene oxide is equal to or greater than the above lower limit values, this is advantageous from the industrial viewpoint because the dispersion state of the polyalkylene oxide in the polyvinyl alcohol fiber is good, the readily fibrillatability is improved, and adjustment of the viscosity of the spinning dope is easy at the spinning step. When the weight average molecular weight Mw of the polyalkylene oxide is equal to or smaller than the upper limit values, a fiber with reduced feathers (single yarn breakage) can be obtained because the dispersion state of the polyalkylene oxide in the polyvinyl alcohol fiber is good, the readily fibrillatability is improved, and any dropout of the polyalkylene oxide at the spinning step is suppressed. In the present invention, the weight average molecular weight Mw can be measured using gel permeation chromatography.

In the present invention, it is considered that the polyalkylene oxide is comprised in the polyvinyl alcohol fiber and functions as a fibrillation auxiliary agent. In the polyvinyl alcohol fiber of the present invention, at least a portion of the polyvinyl alcohol and that of the polyalkylene oxide are not mutually soluble to cause phase separation thereof. The structure of the phase separation is not especially limited while examples thereof include, for example, a sea-island structure, an interconnection structure, and a layered structure. It is considered that, in the polyvinyl alcohol fiber of the present invention, at least the portion of the polyvinyl alcohol and that of the polyalkylene oxide cause the phase separation thereof to thereby cause any peeling to tend to be avoided at their interface and, as a result, the fiber tends to be easily fibrillated.

In the readily fibrillative polyvinyl alcohol fiber of the present invention, the mass ratio of the polyalkylene oxide relative to the total amount of the polyvinyl alcohol and the polyalkylene oxide, preferably, is equal to or higher than 3% by mass, more preferably, is equal to or higher than 5% by mass, further preferably, is equal to or higher than 7% by mass, preferably, is equal to or lower than 40% by mass, more preferably, is equal to or lower than 35% by mass, more preferably, is equal to or lower than 30% by mass, especially preferably, is equal to or lower than 25%, particularly preferably, is equal to or lower than 20% by mass, and highly preferably, is equal to or lower than 15% by mass to be, for example, equal to or lower than 10% by mass. When the mass ratio of the polyalkylene oxide is equal to or higher than the lower limit values, the readily fibrillatability of the polyvinyl alcohol fiber is further improved. When the mass ratio of the polyalkylene oxide is equal to or lower than the upper limit values, the rate of the polyalkylene oxide in the polyvinyl alcohol fiber is suppressed to be low and, as a result, exertion of the properties originated from the polyvinyl alcohol such as high adhesiveness for pulp, alkali resistance, and proper water absorption property is facilitated and the fiber spinning property can also be further improved. When a fibrillation auxiliary agent such as starch or cellulose is used, a large amount of the fibrillation auxiliary agent needs to be added to the polyvinyl alcohol fiber to cause fibrillation to occur. In this case, the properties originally retained by the polyvinyl alcohol are degraded because the content of the polyvinyl alcohol in the obtained fiber is reduced.

The fiber true circle equivalent diameter of the readily fibrillative polyvinyl alcohol fiber of the present invention, preferably, is equal to or larger than 5 μm, more preferably, is equal to or larger than 7 μm, further preferably, is equal to or larger than 10 μm, preferably, is equal to or smaller than 50 μm, more preferably, is equal to or smaller than 30 μm, and further preferably, is equal to or smaller than 20 μm. When the fiber true circle equivalent diameter of the readily fibrillative polyvinyl alcohol fiber is equal to or larger than the lower limit values, generation of any single yarn agglutination tends to be avoided during the spinning and this is industrially advantageous. When the fiber true circle equivalent diameter of the readily fibrillative polyvinyl alcohol fiber is equal to or smaller than the upper limit values, the fibrillation efficiency during the fiber beating is good. In the present invention, the "fiber true circle equivalent diameter" means the diameter of a true circle that has the equal area to the area of the cross-section of the fiber.

The polyvinyl alcohol fiber of the present invention may comprise an inorganic pigment, an organic pigment, a heat deterioration inhibitor, a pH adjusting agent, a cross-linking agent, an oil solution, and the like each within a range not degrading the effect of the present invention, in addition to the polyalkylene oxide.

The readily fibrillative polyvinyl alcohol fiber of the present invention can be manufactured using a method that comprises a preparation step of preparing a spinning dope that comprises a polyvinyl alcohol, a polyalkylene oxide, and water, a spinning step of obtaining a fiber by performing spinning using the spinning dope, a stretching step of stretching the fiber, and an acetalization step of acetalizing the polyvinyl alcohol comprised in the fiber.

At the preparation step, the polyvinyl alcohol and the polyalkylene oxide are dissolved in water, being heated when necessary, to prepare the spinning dope. When necessary, boric acid, an alkaline component (for example, sodium hydroxide), an antifoam agent, and the like may be blended in the spinning dope. The concentration of the polyvinyl alcohol in the spinning dope is usually 10 to 20% by mass. The mass ratio of the polyalkylene oxide relative to the total amount of the polyvinyl alcohol and the polyalkylene oxide is equal to the mass ratio of the polyalkylene oxide relative to the total amount of the polyvinyl alcohol and the polyalkylene oxide in the readily fibrillative polyvinyl alcohol fiber.

At the spinning step, the fiber is obtained by performing the spinning using the spinning dope that is obtained at the preparation step. For example, the spinning dope is spun from a spinneret into a coagulating bath to thereby be dehydrated and coagulated. The spinneret may have a circular shape or may have a different shape other than the circular shape such as, for example, a flattened shape, a cross shape, a T-like shape, a Y-like shape, an L-like shape, a triangular shape, a square shape, or a star-like shape. A water solution of an inorganic salt that has a dehydration capacity and that is traditionally used for wet spinning of a polyvinyl alcohol fiber is usable as the coagulating bath. Above all, a thenardite (sodium sulfate+hydrate) water solution is advantageously used as the coagulating bath. From the viewpoint of enhancing the strength of the obtained fibril, boric acid may be dissolved in the spinning dope and an alkali may further be comprised therein. The temperature of the coagulating bath is not especially limited while, preferably, the temperature is usually about 30 to about 50° C. because any agglutination of the fiber tends to be avoided at a lower temperature.

At the spinning step, when boric acid is added to the spinning dope and this spinning dope is spun into a coagulating bath comprising the thenardite water solution that contains the alkali, to thereby perform gel spinning, preferably, the addition amount of boric acid in the spinning dope is equal to or lower than 1% by mass relative to the total amount of the polyvinyl alcohol and the polyalkylene oxide. When the addition amount of boric acid in the spinning dope is in the above range, generation of any cross-linking by boric acid tends to be avoided during dry-heat stretching performed later, and the stretching can smoothly be performed. In the case where the spinning step is performed not using the gel spinning but using an ordinary wet coagulation method, using the coagulating bath comprising the thenardite water solution containing an alkali, when washing treatment by boric acid is performed to the fiber obtained by the spinning, dissolution and agglutination of the fiber tend to be caused. Preferably, the washing by boric acid is therefore not performed.

Next, at the stretching step, the fiber obtained at the spinning step is stretched. For example, the fiber is pulled from the coagulating bath using a roller into air to thereby perform the stretching. The stretching step may be performed using any one of a method using a guide, a method using a roller, and the like. The stretching may be performed in air, may be performed in a high temperature salt water solution (moist-heat stretching), or may be performed using both of these. In general, preferably, a method of stretching the fiber using a roller in air and performing thereafter the moist-heat stretching is employed. Preferably, the moist-heat stretching is performed at a temperature of about 40 to 90° C. using a saturated thenardite water solution bath. In this case, more preferably, the moist-heat stretching bath is maintained to be acidic because any agglutination of the fiber can be prevented. The stretching is performed such that the stretching ratio is usually 2 to 5 and, preferably, about 3 or 4. The "stretching ratio" refers to the ratio of the length of the fiber after the stretching relative to the length of the fiber before the stretching.

The fiber obtained in this manner is thereafter dried to remove water therefrom and dry-heat stretching is performed such that the stretching ratio is about 2 to 3. The dry-heat stretching is performed such that the total stretching ratio is equal to or greater than 6, preferably, is equal to or greater than 7, and, more preferably, is about 7 to 13. The drying is usually performed without weakening the tension during the spinning and stretching at a temperature of about 80 to 140° C. until the water is sufficiently removed and, preferably, the dry-heat stretching performed thereafter is performed being heated to about 200 to about 240° C. in air. The "stretching ratio of the dry-heat stretching" as used herein refers to the ratio of the length of the fiber after the dry-heat stretching is performed relative to the length of the fiber after the stretching is performed and before the dry-heat stretching is performed, and the "total stretching ratio" refers to the ratio of the length of the fiber after the dry-heat stretching relative to the length of the fiber before the stretching is performed.

Next, at the acetalization step, the fiber obtained at the stretching step is acetalized using an acetal compound. Examples of the acetal compound include, for example, monoaldehydes such as formaldehyde and acetaldehyde; dialdehydes such as glutaraldehyde, hexanedial, and nonanedial; and acetals formed by masking the aldehyde groups of these aldehydes by acetalization with methanol, ethanol, or ethylene glycol. Especially, preferably, formaldehyde is used as the acetal compound because formaldehyde is easily diverted to the existing manufacture equipment and is also industrially advantageous. The acetalization using formaldehyde is especially referred to as "formlization".

The acetalization is performed using a composition solution that contains a mineral acid such as sulfuric acid, an acetal compound, and, when necessary, a small amount of mineral acid salt. Examples of the mineral acid include, for example, inorganic acids such as sulfuric acid, phosphoric acid, nitric acid, and chromic acid, and organic acids such a carboxylic acid and a sulfonic acid. The concentration of the mineral acid in the composition solution usually is 0.3 to 3 mol/l. The concentration of the acetal compound therein usually is 0.6 to 7 mol/l. The temperature of the composition solution at the acetalization step usually is 50 to 90° C. and, preferably, is 60 to 80° C.

The acetalization degree of the fiber at the acetalization step, preferably, is equal to or higher than 3% by mol, more preferably, is equal to or higher than 6% by mol, further preferably, is equal to or higher than 8% by mol, further more preferably, equal to or higher than 10% by mol, preferably, is equal to or lower than 40% by mol, more preferably, is equal to or lower than 30% by mol, further preferably, is equal to or lower than 20% by mol, and, further more preferably, is equal to or lower than 15% by mol. When the acetalization degree of the polyvinyl alcohol is equal to or higher than the lower limit values, a readily fibrillative polyvinyl alcohol fiber excellent in the water resistance can be obtained. When the acetalization degree of the polyvinyl alcohol is equal to or lower than the upper limit values, the readily fibrillatability of the obtained polyvinyl alcohol fiber is further improved.

The polyvinyl alcohol fiber of the present invention can be manufactured as described above. The polyvinyl alcohol fiber of the present invention in which no cellulose-based polymer or the like is used and the polyalkylene oxide that is water-soluble is used, and can therefore be spun using not any organic solvent but an aqueous solution. With the spinning using an organic solvent, the total manufacture cost is high including that of collection of the solvent and the like while, in the present invention, as described above, water-based spinning using the aqueous solution can be performed and the spinning can be performed without collecting any organic solvent. The manufacture cost can therefore be suppressed to be low. In the present invention, because no cellulose-based polymer is used, no problem of any cross-linking at the interface of the polyvinyl alcohol/the polyalkylene oxide due to the acetalization process arises and, even when the acetalization degree is high, the readily fibrillatability is not significantly degraded.

The fibrillation method for the polyvinyl alcohol fiber of the present invention is not especially limited. The readily fibrillative fiber can usually be fibrillated by using the chemical swelling power alone, the mechanical stress alone, or both of these. The "chemical swelling power" refers to the capacity to swell the constituent components of the fiber such as the polyvinyl alcohol and the polyalkylene oxide. A swelling agent swelling these constituent components is not especially limited while examples thereof include, for example, water. The mechanical stress can be applied by a mixer, a beater, a refiner, a screw, and/or the like that each apply a shearing force to the polyvinyl alcohol fiber.

Examples of the fibrillation method for the readily fibrillative polyvinyl alcohol fiber of the present invention include a method of performing fibrillation in the state of a short fiber obtained by cutting the fiber into and a method of performing fibrillation after the fiber is processed to be a sheet-like article. In the method performed when the fiber is cut into a short fiber, for example, the fiber is cut to have a length of 1 to 30 mm, to be immersed and dispersed in water. A mechanical stress is applied to the fiber using a mixer or the like and the fibrillation can thereby be performed. In the method performed after the fiber is processed to be a sheet, for example, the fiber is orimped/cut, and carding is performed therefor to form a sheet-like article (a web). The fibrillation can be performed by applying a high pressure water flow at 30 kg/cm$^2$ or higher to the sheet-like article, or the fibrillation can also be performed by needlepunch-processing the sheet-like article. The average diameter of the fibril is, for example, 0.05 to 8 μm. The "average diameter of the fibril" means the diameter of the true circle that has the equal area to the area of the cross-section of the fibril. The average diameter of the fibril can be measured, for example, using a scanning or a transmission electron microscope.

The readily fibrillative polyvinyl alcohol fiber of the present invention can be used for applications such as a battery separator, a capacitor separator, filters, a binder fiber, a cut fiber for paper manufacture, staple for dry non-woven fabrics, staple for spinning, a multi-filament for fabrics, a cement reinforcement material, a rubber reinforcement material, a packaging material, a sanitary material, medical disposable products, an agricultural covering material, wipers, insulating paper, an artificial leather, a felt pen tip, and the like.

EXAMPLES

The present invention will be described in detail with reference to Examples and Comparative Examples while the present invention is not limited to them.

The fiber true circle equivalent diameter of the readily fibrillative polyvinyl alcohol fiber was calculated as below.

The fiber true circle equivalent diameter was determined by conversion from the textile degree (dtex) of the readily fibrillative polyvinyl alcohol fiber. The textile degree was measured in accordance with JIS L1013 "Chemical Fiber Filament Yarn Testing Method", the Corrected Weight Textile Degree, 8.3.1 b), and the fiber true circle equivalent diameter was calculated in accordance with the following calculating formula from the textile degree.

Diameter (μm)=10√textile degree (dtex)

Example 1

A polyvinyl alcohol (the viscosity average polymerization degree: 1,700, the saponification degree: 99.9% by mol) was dissolved in water to prepare a 15% by-mass polyvinyl alcohol water solution. A polyethylene oxide (the weight average molecular weight Mw: 80,000) was added at 10% by mass relative to the total amount of the polyvinyl alcohol and the polyethylene oxide to prepare a spinning dope. To the spinning dope, a surface active agent (manufactured by Miyoshi Oil and Fat Co., Ltd., VL-22) was added at 0.003% by mass and an antifoam agent (manufactured by Shinnihon Kasei Co., Ltd., Jolshin LB-D) was added at 0.002% by mass, aiming at improving the spinnability. This spinning dope was discharged at 90° C. from a spinneret whose number of holes was 1,000 and whose hole diameter was 80 μmφ (a circular shape) into a coagulating bath containing a saturated sodium sulfate water solution at 45° C., was pulled by a first roller, followed by a stepwise four-stage moist-heat stretching with a draw ratio of 4 through a second roller up to a drying roller. Drying was thereafter performed at 130° C. Stretching with a draw ratio of 2 was subsequently performed. Using a composition solution containing sulfuric acid (a mineral acid) of 2 mol/l and formaldehyde of 1 mol/l, an acetalization process was performed at 70° C. to set the acetalization degree (the formalization degree) of the polyvinyl alcohol to be 10% by mol to obtain a readily fibrillative polyvinyl alcohol fiber. The fiber true circle equivalent diameter of the obtained readily fibrillative polyvinyl alcohol fiber was 14 μm (the size before the beating).

Example 2

A readily fibrillative polyvinyl alcohol fiber was obtained in the same manner as in Example 1 except the fact that, at the step of preparing the spinning dope, the polyethylene oxide was added at 3% by mass relative to the total amount of the polyvinyl alcohol and the polyethylene oxide. The fiber true circle equivalent diameter of the obtained readily fibrillative polyvinyl alcohol fiber was 14 μm.

Example 3

A readily fibrillative polyvinyl alcohol fiber was obtained in the same manner as in Example 1 except the fact that, at the step of preparing the spinning dope, the polyethylene oxide was added at 40% by mass relative to the total amount of the polyvinyl alcohol and the polyethylene oxide. The fiber true circle equivalent diameter of the obtained readily fibrillative polyvinyl alcohol fiber was 14 μm.

Example 4

A readily fibrillative polyvinyl alcohol fiber was obtained in the same manner as in Example 1 except the fact that, at the step of acetalization, the acetalization degree of the polyvinyl alcohol was 3% by mol. The fiber true circle equivalent diameter of the obtained readily fibrillative polyvinyl alcohol fiber was 14 μm.

Example 5

A readily fibrillative polyvinyl alcohol fiber was obtained in the same manner as in Example 1 except the fact that, at the step of acetalization, the acetalization degree of the polyvinyl alcohol was 25% by mol. The fiber true circle equivalent diameter of the obtained readily fibrillative polyvinyl alcohol fiber was 14 μm.

Example 6

A readily fibrillative polyvinyl alcohol fiber was obtained in the same manner as in Example 1 except the fact that, at the step of preparing the spinning dope, an ethylene oxide/propylene oxide copolymer (the weight average molecular weight Mw: 80,000, the mol ratio of the ethylene oxide/propylene oxide: 90/10, manufactured by Meisei Chemical Works, LTd., Alkox EP1010N) was used instead of the polyethylene oxide. The fiber true circle equivalent diameter of the obtained readily fibrillative polyvinyl alcohol fiber was 14 μm.

Comparative Example 1

A polyvinyl alcohol fiber was obtained in the same manner as in Example 1 except the fact that, at the step of preparing the spinning dope, the polyethylene oxide was not added. The fiber true circle equivalent diameter of the obtained polyvinyl alcohol fiber was 14 μm.

Comparative Example 2

A polyvinyl alcohol (the viscosity average polymerization degree: 1,700, the saponification degree: 99.9% by mol) was dissolved in DMSO to prepare a 15% by-mass polyvinyl alcohol solution. Cellulose acetate (the viscosity average polymerization degree: 180, the acetylization degree of 55% by mol) was added at 40% by mass relative to the total amount of the polyvinyl alcohol and the cellulose acetate to prepare a spinning dope. To the spinning dope, a surface active agent (manufactured by Miyoshi Oil and Fat Co., Ltd., VL-22) was added at 0.003% by mass and an antifoam agent (manufactured by Shinnihon Kasei Co., Ltd., Jolshin LB-D) was added at 0.002% by mass, aiming at improving the spinnability. This spinning dope was discharged at 90° C. from a spinneret whose number of holes was 1,000 and whose hole diameter was 80 μmφ (a circular shape) into a coagulating bath containing a methanol solution at 20° C., was pulled by a first roller, followed by a stepwise moist-heat stretching with a draw ratio of 4 through a second roller up to a drying roller. Drying was thereafter performed at 130° C. Stretching with a draw ratio of 2 was subsequently performed. Using formaldehyde, an acetalization process was performed to set the acetalization degree of the polyvinyl alcohol to be 10% by mol to obtain a readily fibrillative polyvinyl alcohol fiber. The fiber true circle equivalent diameter of the obtained readily fibrillative polyvinyl alcohol fiber was 14 μm.

Comparative Example 3

A readily fibrillative polyvinyl alcohol fiber was obtained in the same manner as in Comparative Example 2 except the fact that, at the step of preparing the spinning dope, a starch (corn starch, manufactured by Sanwa Starch Co., Ltd., Sanwa Corn Alpha-Y) was used instead of cellulose acetate. The fiber true circle equivalent diameter of the obtained polyvinyl alcohol fiber was 14 μm.

The following measurement and evaluation were performed using the readily fibrillative polyvinyl alcohol fiber obtained in Examples and Comparative Examples. Table 1 shows the result thereof.

Acetalization Degree

Using $^{13}$C-NMR, the acetalization degree of the readily fibrillative polyvinyl alcohol fiber was determined from the ratio of the peak area originated from the acetal bonding between formaldehyde (an acetal compound) and the polyvinyl alcohol, and the peak area of methine carbon of the polyvinyl alcohol.

Spinning Step Property Evaluation

At the spinning step, using a roller (the diameter: 25 cm), the number of winding turns of the fiber on the roller was measured when spinning was performed for 2 hours under the condition of a winding velocity of 70 m/min. In the present invention, the winding refers to the fact that a single yarn was cut, the terminal filament started to wind around the roller, and all the 1,000 yarns are cut of the 1,000 yarns discharged from the spinneret whose number of holes was 1,000 and whose diameter of the hole was 80 μmφ (a circular shape). The case where the number of winding turns was 0 was determined to be "A", was equal to or greater than 1 and equal to or smaller than 2 was determined to be "B", was equal to or greater than 3 and equal to or smaller than 4 was determined to be "C", and was equal to or greater than 5 was determined to be "D".

Readily Fibrillatability Evaluation

The readily fibrillative polyvinyl alcohol fiber was cut to be 2 mm and 5 g of this fiber was dispersed in 1,000 ml of water at 20° C. and was beaten for 5 minutes using a mixer (manufactured by Matsushita Electric Industrial Co., Ltd., MX-152S, the number of rotations: 9,700 rpm). The obtained beaten solution was filtered to collect the fiber. The obtained fiber was observed using a microscope (manufactured by Olympus Optical Co., Ltd., BX43) to determine presence or absence of generation of any fibril. The case where the diameter of the fiber obtained by the beating was equal to or larger than 0.5 μm and smaller than 3 μm was determined to be "A", was equal to or larger than 3 μm and smaller than 8 μm was determined to be "B", was equal to or larger than 8 μm and smaller than 14 μm was determined to be "C", and was equal to or larger than 14 μm was determined to be "D".

Water Resistance Evaluation 3 g of the fiber (the fibril) obtained in the readily fibrillatability evaluation was dispersed in 200 g of water, and presence or absence of dissolution of the fibril while being stirred at an increasing temperature was observed. The case where the fibril was dissolved at a temperature equal to or higher than 110° C. was determined to be "A", was dissolved at a temperature lower than 110° C. and equal to or higher than 100° C. was determined to be "B", and was dissolved at a temperature lower than 100° C. was determined to be "C".

With-Pulp Adhesiveness Evaluation 1 g of the fiber (the fibril) obtained in the readily fibrillatability evaluation was uniformly mixed with 1.25 g of pulp (manufactured by Nippon Paper Industries Co., Ltd., NBKP (needle-leaved tree pulp) and 0.25 g of vinylon binder (manufactured by Kuraray Co., Ltd., 1 dtex×3 mm), and wet papermaking (Kumagai Riki Kogyo Co., Ltd., TAPPI (25×25 cm) paper machine) was performed therefor to obtain a sheet (the basis weight: 40 g/m², the thickness: 100 μm). The paper strength of the obtained sheet was measured. The paper strength measurement was conducted in accordance with JIS P 8113 (Paper and Cardboard—Testing Method for Tension Property) and using an Instron tension testing machine (manufactured by Instron, Instron 5543). The case where the paper strength was equal to or higher than 4 kg/15 mm was determined to be "A", was equal to or higher than 3.5 kg/15 mm and lower than 4 kg/15 mm was determined to be "B", was equal to or higher than 3 kg/15 mm and lower than 3.5 kg/15 mm was determined to be "C", and was lower than 3 kg/15 mm was determined to be "D."

TABLE 1

| | | Spinning Method | Additive Agent Type | Additive Agent Mass Ratio (% by mass) | Polyvinyl Alcohol Acetalization Degree (% by mol) |
|---|---|---|---|---|---|
| Example | 1 | Water-based spinning | PEO | 10 | 10 |
| | 2 | Water-based spinning | PEO | 3 | 10 |
| | 3 | Water-based spinning | PEO | 40 | 10 |
| | 4 | Water-based spinning | PEO | 10 | 3 |
| | 5 | Water-based spinning | PEO | 10 | 25 |
| | 6 | Water-based spinning | EO/PO | 10 | 10 |
| Comparative Example | 1 | Water-based spinning | — | 0 | 10 |
| | 2 | Solvent-based spinning | Cellulose acetate | 40 | 10 |
| | 3 | Solvent-based spinning | Starch | 40 | 10 |

| | | Evaluation Test | | | |
|---|---|---|---|---|---|
| | | Spinning Step Property | Readily Fibrillatability | Water Resistance | With-Pulp Adhesiveness (Paper Strength kg/15 mm) |
| Example | 1 | B | A | A | A (4.8) |
| | 2 | A | B | A | A (4.9) |
| | 3 | C | A | A | B (3.6) |
| | 4 | B | A | B | A (4.7) |
| | 5 | B | B | A | B (3.8) |
| | 6 | B | A | A | A (4.8) |
| Comparative Example | 1 | A | D | A | D (2.9) |
| | 2 | B | B | B | D (2.8) |
| | 3 | B | B | B | D (2.6) |

PEO: Polyethylene oxide
EO/PO: Ethylene oxide/propylene oxide copolymer

It can be seen from the result in Table 1 that all the polyvinyl alcohol fibers obtained in Examples 1 to 6 according to the present invention each had readily fibrillatability. It can also be seen that the fibers were each excellent in adhesiveness with pulp and each exerted the property originated from the polyvinyl alcohol.

All of Examples 1 to 6 according to the present invention employed the water-based spinning as the spinning method and the manufacture cost thereof was therefore able to be suppressed to be low compared to that of the solvent-based spinning, and were therefore industrially highly advantageous.

On the other hand, from the result of Comparative Examples in Table 1, in Comparative Example 1 to the present invention, when any polyethylene oxide to be a fibrillation auxiliary agent was not added at the step of preparing the spinning dope, no fibrillation property is exerted. In Comparative Examples 2 and 3, a large amount of cellulose acetate or starch to be a fibrillation auxiliary agent needs to be added to obtain readily fibrillatability. The property originated from polyvinyl alcohol is not therefore exerted and the adhesiveness with pulp is degraded.

The invention claimed is:

1. A fibrillative polyvinyl alcohol fiber, comprising:
a polyalkylene oxide and a polyvinyl alcohol,
wherein a weight average molecular weight of the polyalkylene oxide is from 50,000 to 200,000, and
wherein a mass ratio of the polyalkylene oxide is from 3 to 40% relative to a total amount of the polyvinyl alcohol and the polyalkylene oxide.

2. The fibrillative polyvinyl alcohol fiber according to claim 1, wherein an acetalization degree of the polyvinyl alcohol is from 3 to 40% by mol.

3. The fibrillative polyvinyl alcohol fiber according to claim 1, wherein a fiber true circle equivalent diameter of the fibrillative polyvinyl alcohol fiber is from 5 to 50 μm.

4. The fibrillative polyvinyl alcohol fiber according to claim 1, wherein the polyalkylene oxide is at least one selected from the group consisting of a polyethylene oxide, a polypropylene oxide, and an ethylene oxide/propylene oxide copolymer.

5. The fibrillative polyvinyl alcohol fiber according to claim 1, wherein the weight average molecular weight of the polyalkylene oxide is from 60,000 to 200,000.

6. A method for manufacturing the fibrillative polyvinyl alcohol fiber according to claim 1, the method comprising:
preparing a spinning dope that comprises a polyvinyl alcohol, a polyalkylene oxide, and water;
obtaining a fiber by spinning using the spinning dope;
stretching the fiber, and
acetalizing the polyvinyl alcohol comprised in the fiber.

7. The fibrillative polyvinyl alcohol fiber according to claim 1, wherein the polyvinyl alcohol comprise at least 20 mol. % of vinyl alcohol units and optionally other monomers.

8. The fibrillative polyvinyl alcohol fiber according to claim 1, wherein a viscosity average polymerization degree of the polyvinyl alcohol is at least 500.

9. The fibrillative polyvinyl alcohol fiber according to claim 1, wherein the polyalkylene oxide is a polymer of one type of alkylene oxide or a copolymer of different alkylene oxide units.

10. The fibrillative polyvinyl alcohol fiber according to claim 1, wherein the polyalkylene oxide comprises alkylene oxide units having 2 to 6 carbon atoms.

11. The fibrillative polyvinyl alcohol fiber according to claim 1, wherein the polyalkylene oxide comprises an ethylene oxide and a propylene oxide monomers and a molar ratio of the ethylene oxide monomers to the propylene oxide monomers is 80/20 to 99/1.

12. The fibrillative polyvinyl alcohol fiber according to claim 1, wherein a fiber true circle equivalent diameter of the fibrillative polyvinyl alcohol fiber is from 7 to 30 μm.

13. The fibrillative polyvinyl alcohol fiber according to claim 1, wherein a fiber true circle equivalent diameter of the fibrillative polyvinyl alcohol fiber is from 10 to 20 μm.

14. The method of claim 6, wherein an amount of the polyvinyl alcohol in the spinning dope is from 10 to 20% by mass.

15. The method of claim 6, wherein in the preparing, the polyvinyl alcohol and the polyalkylene oxide are dissolved in water while being heated, to prepare the spinning dope.

16. The method of claim 6, wherein in the spinning, the spinning dope is spun from a spinneret into a coagulating bath to dehydrate and coagulate.

17. The method of claim 6, wherein in the spinning, boric acid is added to the spinning dope and the spinning dope is spun into a coagulating bath comprising a thenardite water solution that contains the alkali, to thereby perform gel spinning,
wherein an addition amount of the boric acid in the spinning dope is at most 1% by mass relative to a total amount of the polyvinyl alcohol and the polyalkylene oxide.

18. The method of claim 6, wherein in the stretching, a moist-heat stretching is performed at a temperature of from 40 to 90° C. using a saturated thenardite water solution bath.

19. The method of claim 18, wherein the stretching is performed such that a stretching ratio is from 2 to 5 and, wherein the stretching ratio is a ratio of a length of a fiber after the stretching relative to a length of the fiber before the stretching.

* * * * *